US011494240B2

(12) United States Patent
Boshev

(10) Patent No.: US 11,494,240 B2
(45) Date of Patent: Nov. 8, 2022

(54) DYNAMIC RATE LIMITING OF OPERATION EXECUTIONS FOR ACCOUNTS

(71) Applicant: SAP SE, Walldorf (DE)

(72) Inventor: Stoyan Zhivkov Boshev, Sofia (BG)

(73) Assignee: SAP SE, Walldorf (DE)

( * ) Notice: Subject to any disclaimer, the term of this patent is extended or adjusted under 35 U.S.C. 154(b) by 227 days.

(21) Appl. No.: 17/068,245

(22) Filed: Oct. 12, 2020

(65) Prior Publication Data

US 2022/0113973 A1 Apr. 14, 2022

(51) Int. Cl.
G06F 9/46 (2006.01)
G06F 9/50 (2006.01)
G06F 9/38 (2018.01)
G06F 9/30 (2018.01)

(52) U.S. Cl.
CPC .......... *G06F 9/505* (2013.01); *G06F 9/30098* (2013.01); *G06F 9/3836* (2013.01)

(58) Field of Classification Search
CPC ..... G06F 9/505; G06F 9/30098; G06F 9/3836
See application file for complete search history.

(56) References Cited

U.S. PATENT DOCUMENTS

2017/0090979 A1* 3/2017 Dinan .................... G06F 9/5038

OTHER PUBLICATIONS

Deng, Xuefei ; Joshi, K.D; Why Individuals Participate in Microtask Crowdsourcing Work Environment: Revealing Crowdworkers' Perceptions; 2016 vol. 17.*
U.S. Appl. No. 17/067,223, Boshev, filed Oct. 9, 2020.
U.S. Appl. No. 17/098,618, Boshev et al., filed Nov. 16, 2020.

* cited by examiner

*Primary Examiner* — Camquy Truong
(74) *Attorney, Agent, or Firm* — Fish & Richardson P.C.

(57) ABSTRACT

The present disclosure relates to computer-implemented methods, software, and systems for dynamic rate limiting of execution of operation. A request from a user account for execution of an operation by an application service is. A total number of operations registered at an operations registry is determined. In response to determining that all of registered operations exceeds a first threshold value, a number of registered operations associated with a group account of the user account is determined. If it is determined that (i) the total number of registered operations exceeds a first threshold value and that the number of registered operations associated with the group account does not exceed a second threshold value or (ii) if it is determined that the total number of registered operations does not exceed the first threshold value, the operation is registered at the operations registry. An instruction to execute the registered operation is sent.

20 Claims, 6 Drawing Sheets

DYNAMIC RATE LIMITING OF OPERATION EXECUTIONS FOR ACCOUNTS

TECHNICAL FIELD

The present disclosure relates to computer-implemented methods, software, and systems for data processing and operation execution in an application execution environment.

BACKGROUND

Software applications and application services may include front-end and back-end application logic that executes to provide functionality and resources in response to received requests from end users. A backend system can have limited resources including hardware resources, such as memory consumption, processing power, and disk space, among others. Limited resources may be associated with or can cause limitations on execution of operations at the backend system. The backend system may receive requests for execution of operations from different users that may be associated with different accounts. If many heavy operations are triggered by an end-user (or by multiple end-users), the overall availability of the backend system can be affected as the resource capabilities of the system cannot scale the requested load of operations execution. In addition, when a backend system is overloaded, a small operation requiring fewer computational resources may be executed for a longer period than expected due to the increased load at the backend system in general.

SUMMARY

The present disclosure involves systems, software, and computer implemented methods for dynamically configuring limitations for operations' execution at a software application environment.

One example method may include operations such as in response to receiving a request for execution of an operation by an application service, identifying a user account associated with the received request; determining a total number of operations registered at an operations registry, wherein the operations registry is associated with the application service, and wherein the operations registry stores data for executing operations; in response to determining that the total number of registered operations exceeds a first threshold value: reading, from the operations registry, a number of registered operations associated with a group account related the user account, wherein the group account is determined based on the user account, and in response to determining that the number of registered operations associated with the group account does not exceed a second threshold value configured for operation executions associated with the group account, registering the operation at the operations registry; in response to determining that the total number of registered operations does not exceed the first threshold value, registering the operation at the operations registry; and providing an instruction to execute the registered operation to an operations executor. Other implementations of this aspect include corresponding systems, apparatus, and computer programs, configured to perform the actions of the methods, encoded on computer storage devices.

Implementations can optionally include defining a plurality of group accounts for grouping related sets of user accounts, wherein a user account from the sets of user accounts is associated with an allocated number of operations by the application service.

In some instances, in response to determining that the total number of registered operations exceeds the first threshold value, a first number of operations are dynamically configured as the second threshold value for executing operations from user accounts corresponding to the group account, wherein the group account is part of a plurality of group accounts configured for the application service.

In some instances, in response to determining that the operation's execution has completed, performing an unregistration operation to remove the registered operation from the operations registry.

In some instances, the application service is a backend service associated with a predefined hardware and software resources to perform operations in parallel.

In some instances, the example method may include operations to configure the operations registry to track operations executed by the application service, wherein an operation from the tracked operations is registered when it starts to execute, and wherein the operation is maintained as registered in the operations registry until after completion. The operation registry can store data for operations associated with user accounts requesting execution of operations at the application service.

In some instances, implementations can optionally include that in response to determining the read number of operations associated with the group account related the user account exceeds the second threshold value for the group account, providing an instruction to reject execution of the operation. In response to determining that the total number of operations registered at the operations registry exceeds a quota defining a maximum number of allowed operations for execution in parallel for all accounts, the received request may be rejected.

In some instances, in response to determining that the total number of operations does not exceed the first threshold value, an instruction to execute the operation is provided to the operations executor.

In some instances, in response to determining that the total number of operations exceeds the first threshold value, the example method may further comprise operations including: determining that the user account is associated with a third threshold value configured for operation executions solely associated with the user account; in response to the determination: i) reading, at the operations registry, a number of operations associated with the user account, and ii) in response to determining that the number of registered operations associated with the user account exceeds the third threshold value, rejecting the received request.

In some instances, in response to determining that the total number of operations exceeds the first threshold value and that the second threshold value associated with the group account is equal to or less than the number of registered operations associated with the group account, the received request is rejected.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description, drawings, and the claims.

DETAILED DESCRIPTION

Figure 1:
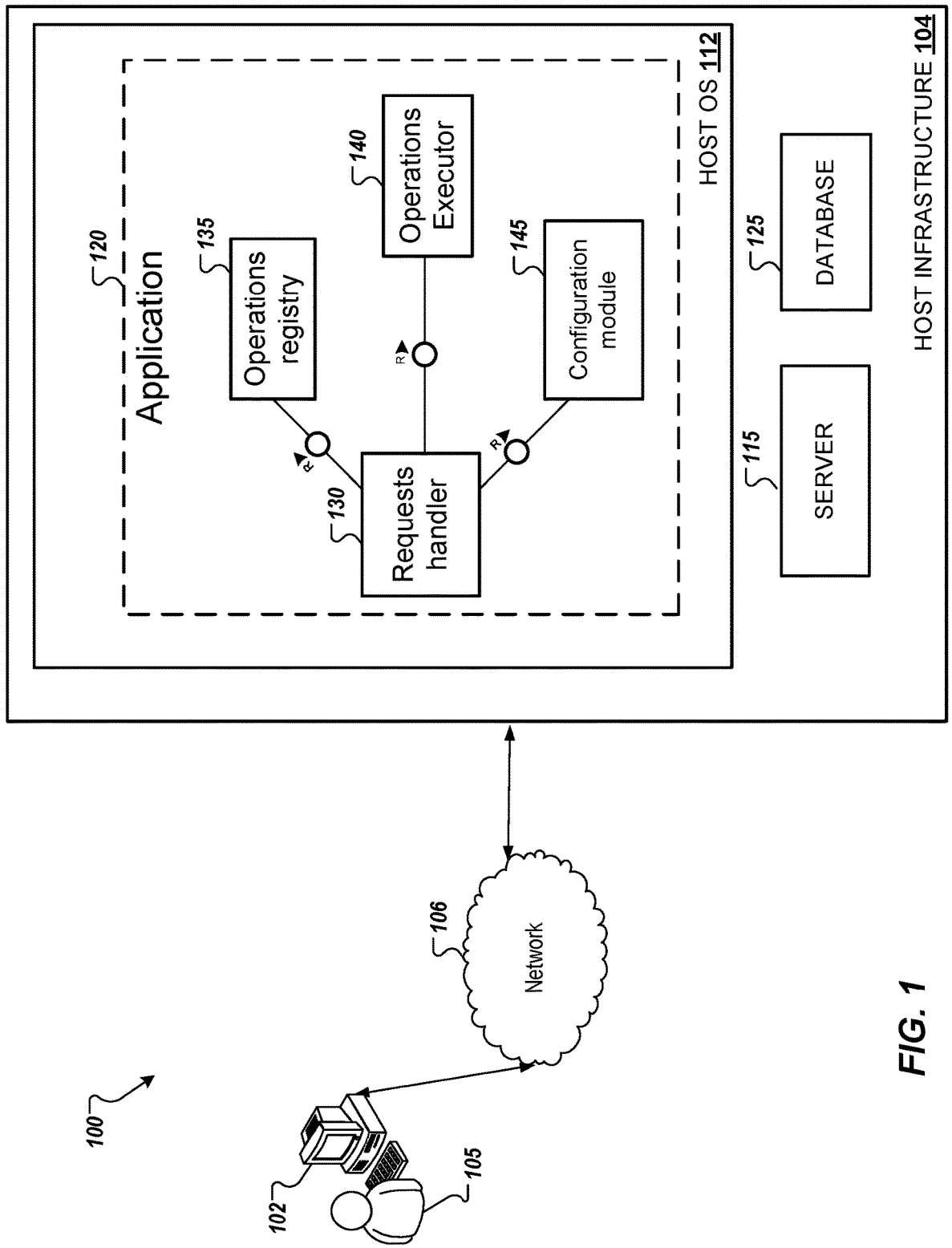
FIG. 1 illustrates an example computer system architecture that can be used to execute implementations of the present disclosure.

The present disclosure describes various tools and techniques for dynamically configuring limitations for operations' executions at a software application environment.

In some instances, software applications provide services that execute operations and provide output, for example, to end users of the software applications. The execution of operations by implemented services may be associated with high consumption of resources, such as, memory consumption, processing power, disk storage space, among others.

In some instances, a software application may handle multiple user requests to perform operations in relation to multiple users associated with one or more clients of the software application. For example, a set of users may be associated with a single client related to an account defined for the software application. Multiple requests may be received from a client in parallel, and processing such parallel requests may affect performance of the application and/or availability of the back-end logic of the software application. In such cases, one client may interfere with the performance of the software application, and this may reflect on or impact the availability of the services provided by the application for consumption by other clients. In other cases, even if multiple requests are received from multiple clients, the multiple requests may create an excessive load for the requested services that can reduce or degrade performance of the application as a whole. Processing requests and executing corresponding operations may increase operating load for the application, thus resulting in reduced performance. For example, the reduced performance may be experienced as increased time for the application to generate output, inefficient processing of requests, data deadlocks, an increased number of rejected requests, an unbalanced service level performance of the application for different clients of the application, and others.

In some cases, software applications are associated with limited hardware and software resources, and cannot handle parallel requests for heavy processing operations. In some instances, different applications can be associated with different load capabilities for their processing operations. If the processing unit associated with an application is overloaded with requests, a received request for a simple operation, that is, a request that is not associated with heavy computing operations and heavy resource consumption, can still be affected with, for example, execution taking much longer than expected or even failing. If the memory is consumed to its highest limit, processes executed at the operating system where the application is running can be terminated, with the whole system being brought down in some cases.

In some instances, execution of operations can be monitored to perform dynamic rate limitations on the execution of operations, for example, in relation to requests received from users associated with different clients. Monitoring data may be collected and reviewed to apply limitations on executions of operations. By applying such limitations, a total number of parallel running operation can be maintained at a suitable number that would not exceed a threshold level of load capable of being handled by the software application. Further, provided services may be pro-rated per user level, client level, and/or user group level, among others, to facilitate balanced loads corresponding to pre-defined service level quotas.

In some instances, an operations registry may be set up and maintained to log operations and operations metadata to monitor current state and load of the application. The operations registry may store data about when an operation has started, who or which entity has initiated it, and others suitable and relevant information. Operations that are triggered for execution may be logged in the operations registry and, once an operation is completed, the completed operation may be removed from the list or log of executing operations. Thus, the operations registry may maintain a list of current operations that are being processed and that have not yet completed. In such cases, the number of operations currently executing for the application and their association with different users may be monitored, and rate limiting logic may be applied to protect the resources of the application. In response to evaluations of stored data at the operations registry and configurations in relation to different users, customer, accounts, groups, and others, the resources provided by the application may be provided or made available in accordance with defined quotas for different users. Further, based on monitoring operations' executions and the particular configurations for different users, load balancing of the application can be improved and services with high availability may be provided to associated customers.

FIG. 1 depicts an example architecture 100 in accordance with implementations of the present disclosure. In the depicted example, the example architecture 100 includes a client device 102, a network 106, and a host infrastructure 104. The host infrastructure 104 includes one or more server devices and databases 125 (e.g., processors, memory). In the depicted example, a user 105 interacts with the client device 102.

In some examples, the client device 102 can communicate with the host infrastructure 104 over the network 106. In general, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices, and server systems.

In some implementations, the host infrastructure 104 includes at least one server 115 and at least one database 125. In the example of FIG. 1, the host infrastructure 104 is intended to represent various forms of servers including, but not limited to a web server, an application server, a proxy server, a network server, and/or a server pool. In general, servers can accept requests for application services and provides such services to any number of client devices (e.g., the client device 102 over the network 106).

In accordance with implementations of the present disclosure, and as noted above, the host infrastructure 104 can host an application 120 that runs over a host operating system 112. The application 120 can be an application service. For example, the application 120 can be a deploy service that received requests for deploying software applications in a platform environment, such as cloud application on a cloud platform environment.

In some instances, the application 120 may be implemented to include rate limiting logic for dynamically configuring limitations for a number of executed operations per user and/or user group based on a pre-defined quota limitations. The pre-defined quota limitations may be defined as default values and/or may be dynamically defined and changed. The application 120 includes several components implemented to support monitoring of operation execution and handling distribution of operations over time based on an evaluation of received requests and an operations registry. The application 120 includes a requests handler 130, an operations registry 135, an operation executor 140, and a configuration module 145.

In some instances, a request for execution of an operation may be received from an end user, such as user 105 at the application 120. Requests are received by the requests handler 130 that implements request processing logic to determine whether requests should be allowed for execution or should be rejected. The requests handler 130 is communicatively coupled to the operations registry 135, the operation executor 140, and the configuration module 145.

In some instances, the operations registry 135 may store information about one or more operations which are currently running and that are associated with the application 120. Each operation that is running may be associated with a user account. When a new operation is about to be executed, it is registered in the operations registry 135. When the execution of an operation is completed, the operation is unregistered and removed from the operations registry 135.

In some instances, the requests handler 130 may request information from the operations registry 135 to perform evaluations and to determine whether to implement a rate limit on operation execution, including whether to reject or allow an operation to be executed. The operations registry 135 may provide information to the requests handler 130 that may include a total number of operations currently running by the application 120, a number of operations associated with a user account, and a number of operations associated with a group account corresponding to the user account, among others. In some instances, a group account may be an association of a number of accounts of a user to form a group.

In some instances, the requests handler 130 may perform checks to determine whether capacity for execution of operations by the application 120 is full or exceeded or whether there is capacity to execute more operations. For example, an application's capacity may be associated with a given number of operations that can be executed in parallel, for example, ten (10) deploy operations. In this example, if the application is executing seven (7) deploy operations, then the application has free capacity to execute three (3) more operations. The requests handler 130 may query the operations registry 135 to determine a total number of operations that are under execution or that are currently executing when a new request for an execution of an operation is received. The requests handler 130 may read configuration data from the configuration module 145, where the configuration module 145 may store information about number of operations that are allocated to a particular account of a user or a group account corresponding to the user. For example, user A may be defined as associated with group account B that is defined for users of a customer B. In such an example, customer B may be associated with an allocated quota for executing a set number of operations in parallel at the operations executor 140. The set of number of operations related to customer B may be an allocated portion of a total number of operations that can be handled by the operations executor 140 if requested in parallel. This total number of operations may be defined based on the hardware and software resources of the operations executor, as well as on an evaluation of an average resource capacity occupied by an average operation executed by the application 120 (e.g., a deploy operation).

In some instances, the requests handler 130 may evaluate the configuration data (e.g., as read from the configuration module 145) and the total number of operations currently executing (e.g., as read from the operations registry 135) to determine whether to accept or reject a received request and to send an operation for execution at the operations executor 140.

In some instances, the requests handler 130 may perform evaluations to determine an available quota for different accounts or clients to determine whether a received request should be sent for execution. Before executing a requested operation, the requests handler 130 may determine whether there is remaining capacity for execution of further operations within the allocated number of operations for a group account associated with a user account of a user requesting the operation execution.

In some instances, the requests handler 130 may evaluate whether a current number of operations registered at the operations registry 135 is higher than a predefined threshold limit of operations that would enable rate limiting of operations executions according to limits configured at the configuration module 145. The predefined threshold defines a threshold level that, when exceeded, enables execution of rate limiting logic to limit the operations that may be executed and registered at the operations registry. For example, the predefined threshold may be defined as a percentage of operations from a maximum number of operations that can be executed in parallel by an execution engine.

The predefined threshold limit may be defined in any suitable manner, for example, to correspond to a percentage of the number of operations corresponding to the load capacity of the hardware and/or software resources of the application 120. For example, the predefined threshold limit may be defined as 70% of the available load and/or capacity. If the capacity of the application 120 is associated with the execution of ten (10) deployment operations in parallel, then when a request is received and seven (7) deploy operations are already registered and running, then rate limiting functionality for operation execution may be enabled. When such rate limiting functionality is enabled, logic for limiting execution of operations according to relate limiting criteria may be determined and the request execution may be evaluated. For example, the requested operation may be determined to be associated with the user account, and the rate limiting logic may include criteria to limit the execution of operations based on their association with a given user account, group of user accounts, or other suitable criteria to filter execution of operations. For this example, if the group account associated with the user account requesting the deploy operation is configured (e.g., at configuration module 145) to be associated with a group account quota (or threshold limit) defining 5 operations, then the registered operation at the operations registry 135 may be evaluated to determine the number of running operations associated with the group account. In such cases, if the registered operations for this group account is determined to be 5, then the quota defined for this group account is occupied and the request would be rejected. However, if a subsequent request is received from a different user associated with a different group account where there is still free operations within their quota for execution, then that request may be allowed and instructions for operation execution may be sent to the operations executor 140.

In some instance, the configuration module 145 may persist configuration information set up and/or defined for the application 120. The configuration information may define rate limiting for providing services by the application 120 in response to user requests. Different users may be grouped into a group account and may be associated with configuration data that defines a rate limit for each user account associated with the group account. In some instances, a user from a group account may also be associated with a separate rate limit that may be configured and provided as information to the requests handler 130 when a request from the user account is received. For example, when the quota of the group account is occupied up to a certain limit, then the additional user from the group account may be limited from starting additional operations for execution. In other instances, conditional rate limits may be applied after a percentage of a group account quota is used, such that requests received after 5 of 10 allowed operations are already executed are treated and considered under more restrictive rate limit logic and allowances. In some instances, a group account can be associated with default threshold values for their collective quota assigned to the account. The configuration module 145 may provide the default configurations for quota limiting unless there are additional specific configurations used to override the default threshold values. Further, the activation of default configuration may also be configurable and activated and deactivated for some or all users and user groups defined for the application.

Figure 2:
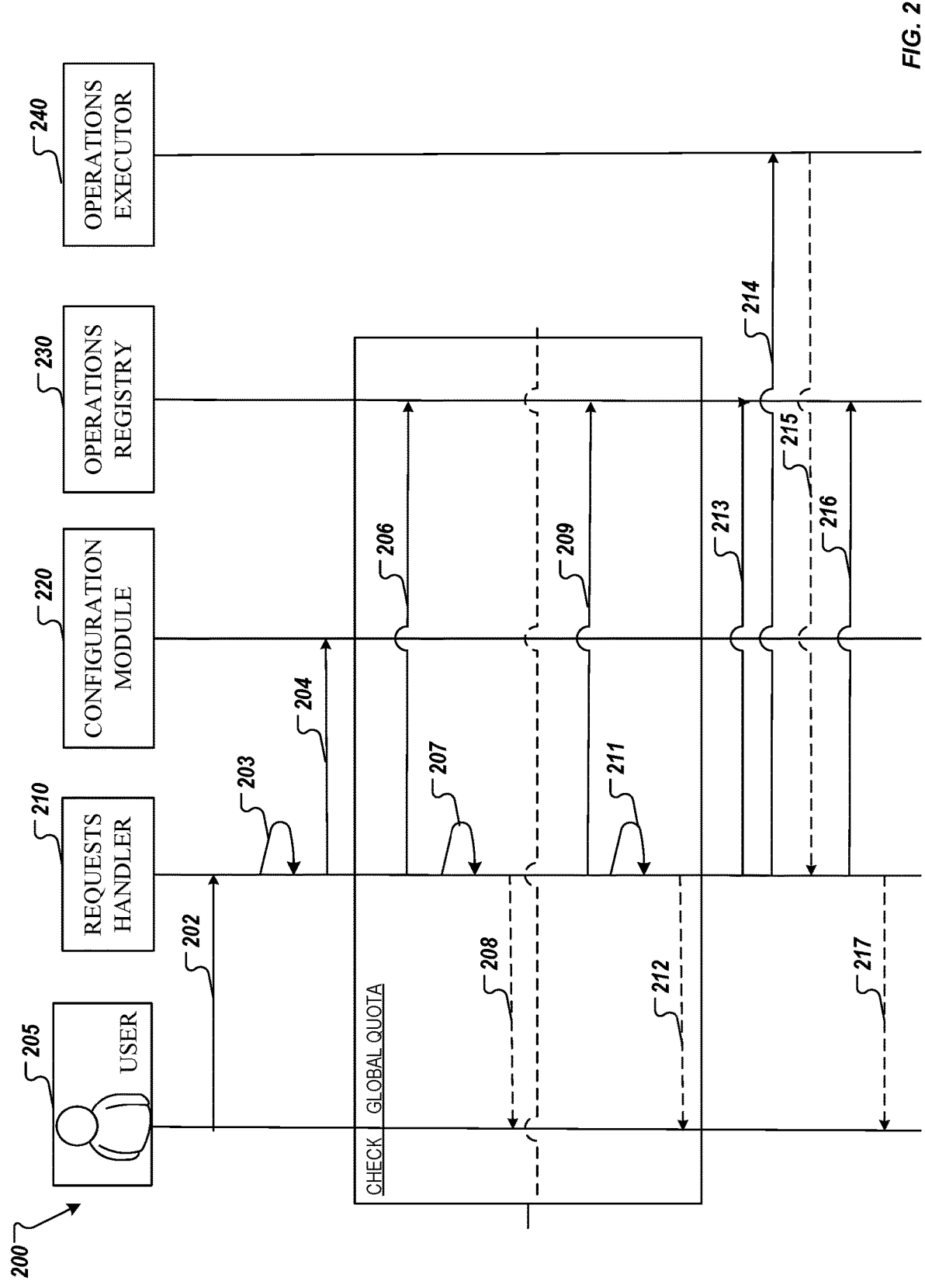
FIG. 2 is a block diagram for an example method for limiting operations' executions in accordance with implementations of the present disclosure.

FIG. 2 is a block diagram for an example method 200 for limiting operations' executions in accordance with implementations of the present disclosure. In some instances, the method 200 is executed in relation to an application, such as application 120 of FIG. 1.

In some instances, limiting operations execution may be based on evaluation of configurations defined for accounts of users or groups of accounts. Accounts of users and/or groups of accounts may be allocated quotas defining allowable number of operations. By allocating numbers of allowable numbers of operations per user account or group of accounts or other way of organizing multiple accounts, load of the application may be balanced when handling requests from multiple users requesting services from the application in a simultaneous manner. For example, the rate limit of operations may be implemented for an application by implementing evaluation logic and rules for operation execution restrictions. Based on evaluation of the current load of the application and a configured rate of the operations execution, restrictions on the execution of operations requested by users may be implemented to perform according to a configured rate of operations execution. The rate limiting of operations may provide multiple advantages for execution of the application, such as load balancing, control over downtime of the application, and improved resource utilization, among others. The application may be implemented to include a requests handler 210, a configuration module 220, an operations registry 230, and an operations executor 240. In some instances, these components may correspond to the requests handler 130, the configuration module 145, the operations registry 135, and the operations executor 140 of FIG. 1, respectively. The operations registry 230 may store data for operations that are currently being executed and have not yet completed. For example, the application may be a deploy service providing functionality to end users to request deployment of the application at a platform environment. The application may be configured to execute multiple operations in parallel that correspond to requested deploy operations. The hardware and software resources used in executing the application may be associated with limited bandwidth and availability, and may be associated with the number of deploy operations that can be executed in parallel.

In some instances, a user 205 requests an operation to be executed at the application. For example, if the application is a deploy service, then the user 205 can request the deploy service to perform a deploy operation for a requested application. For example, the user 205 may provide binary files and/or other deployable files and configuration for the deployment of the application. At 202, the user 205 sends the request to the requests handler 210, where, at 203, the requests handler 210 processes the received request to extract user account information.

The requests handler 210 requests to read configuration information from the configuration module 220 at 204. The requests handler 210 requests to read defined quotas for the user account and/or for a group account associated with the user account.

At 206, the requests handler 210 sends a request to the operations registry 230 to read information about the number of operations that are registered as being currently executed at the operations executor 240 of the application. The operations registry 230 may store data about the initiated, but not yet completed, operations. At 207, the requests handler 210 may determine whether the currently executing operations exceed a defined global quota, where the defined global quota may be the maximum allowed operations to run in parallel for the application. At 208, if the global quota is determined to be exceeded, the operation is rejected and a return rejection response is sent to the user 205. In some instances, if it is determined the global quota is exceeded after a request has been received, the requests may be stored in a queue for a predefined timeout period for processing at a time point when the number of currently executing operations is reduced and the global quota is no longer exceeded. For example, the queue may store a number of such requests in an ordered manner according to the timeline of receiving such requests, and if after the given timeout period a request from the queue is not processed, then a response to the requester (i.e., user 205) may be returned to reject the requested operation.

At 209, the requests handler 210 reads the number of operations associated with a group account from the operations registry 230. The group account includes the user account of user 205. The group account can be limited to an allowed quota defining an allocated number of operations from the global quota of the application that may be associated with user accounts from that group account. At 212, if the quota defined for the group account is exceeded by the number of operations currently executing for this group account (as determined at 211), the operation execution is rejected and a return rejection response is sent to the user 205.

At 211, if the quota defined for the account group is not exceeded by the number of registered operations for the group account at the operations registry 230, then at 213, the requests handler 210 sends a registration request to the operations registry 230 to register the execution of the operation.

At 214, the requests handler 210 sends instructions to the operations executor 240 to execute the requested operation as received at 202. Once the operation is executed and completed, the operations executor 240 sends a notification to the requests handler 210 that the operation is performed at 215. At 216, the requests handler 210 sends a request to unregister the operation to the operations registry 230, as the operation has completed. At 217, the requests handler 210 sends a return response providing a notification to the user 205 that the operation is completed.

Figure 3:
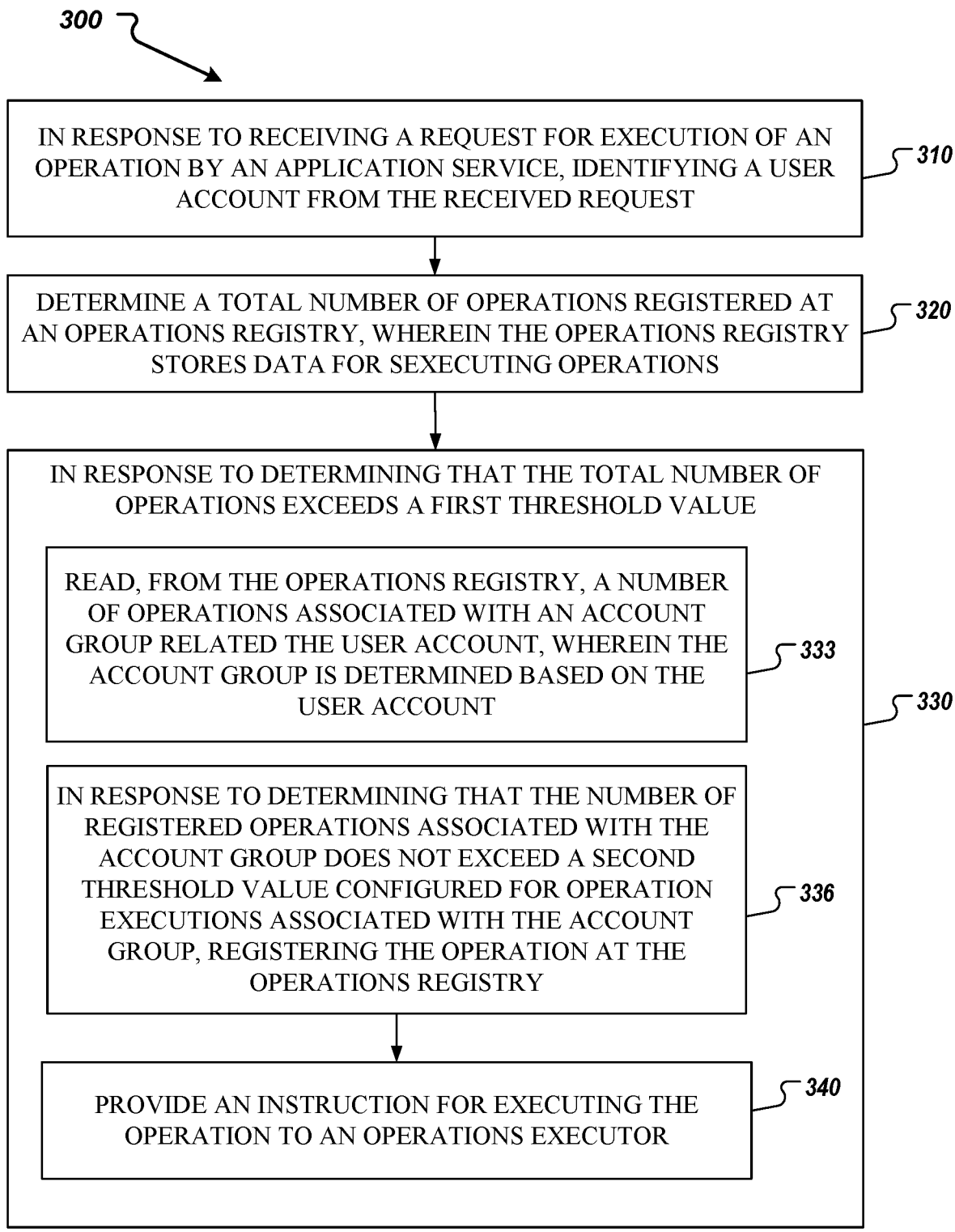
FIG. 3 is a flowchart for an example method for limiting operations' executions in accordance with implementations of the present disclosure.

FIG. 3 is a flowchart for an example method 300 for limiting operations' executions in accordance with implementations of the present disclosure. In some instances, the method 300 is executed in relation to an application providing one or more application services, such as application 120 of FIG. 1. The application may receive requests from end users associated with different accounts and group accounts. The received requests may be related execution of operations provided by the application and related to the application's services or operations. In some instances, the requests may be for or related to the execution of operations that are determined to consume computational resources above a predefined threshold value and categorized as heavy operations. For example, the service may be a deployment service, where a user may request from the application that a particular user-identified application is deployed at an identified platform environment. In some instances, the application service may be a backend service associated with a predefined hardware and software resources to perform operations in parallel.

At 310, in response to receiving a request for execution of an operation associated with an application service, a user account of the received request is identified. For example, the user account may be identified based on extracting information from the received request. Any suitable method of information extraction may be used, either obtaining information from the received request payload or metadata, or by analyzing available details associated with the request.

At 320, a total number of operations registered at an operations registry are determined. In some instances, the application service may be specifically associated with an operations registry, such as the operations registry 135 of FIG. 1, where operations executed by the application are tracked from initiation through completion, and where the operations registry may store data for started and not completed operations. The operations registry may be configured to track operations executed by the application service, where an operation from the operations is registered when it starts to be executed, and the operation is maintained as registered in the operations registry until completion. Upon completion, a deregistration operation can be performed when particular operations are completed. The operation registry may store data for operations associated with user accounts requesting execution of operations at the application service.

In some instances, if it is determined that the total number of operations registered at the operations registry exceed a quota defining a maximum number of allowed operations for execution in parallel, the received request for operation execution is rejected.

At 330, total number of operations may be determined. A first threshold value may be defined and may be configured for use when evaluating a received request. The total number of operations may be compared with the first threshold value to determine the load of the operation executor of the application. In some instances, the first threshold value may be configured as an upper limit that when exceeded, a dynamic configuration for rate limiting operation execution operations may be triggered, such that additional restrictions and evaluations are performed.

In some instances, in response to determining that the total number of operations is below the first threshold value, the operation may be approved for execution and an instruction for executing the operation may be provided to the operations executor.

At 333, if the number of operations that are running for the application service exceeds the first threshold value, then a number of operations associated with a group account related to the user account associated with the received request are read from the operations registry. The group account can be determined based on the extracted information for the user account and based on configurations defined for group accounts at a configuration module related to the application service.

In some instances, a plurality of group accounts may be defined for grouping corresponding sets of user accounts. Those definitions may be provided to the configuration module of the application service and saved as configuration data in relation to the user information for the application service and the defined authorizations and rights for the users and the groups of users.

Further, at 336, if it is determined that the number of registered operations associated with the group account does not exceed a second threshold value configured for operation executions associated with the group account, then the requested operation is registered at the operations registry. In such cases, the operations that are currently executed in relation to the group account are less than the allocated quota for the group account. For example, the second threshold value can be configured to be the allocated quota to the account. Such configuration can be performed, for example, at the configuration module of the application service.

In some instances, in response to determining that the total number of operations exceeds the first threshold value, a first number of operations may be dynamically configured as the second threshold value, thereby enabling dynamic rate limiting of the operation execution. The first number of operations may be defined as the second threshold value to allow for limiting the operations started by user accounts corresponding to the group account. The group account may be part of a plurality of group accounts configured for the application service.

In some instances, in response to determining that the total number of operations is above the first threshold value and that the second threshold value is equal to or below the number of executing operations associated with the group account, the received request is rejected.

In some instances, in response to determining that the second threshold value for the group account is above the number of executing operations associated with the account group, an instruction for rejecting the execution of the operation is provided.

In some instances, the rate limitation for operation execution may be based on user account level. For example, a configuration may define quotas of allowed parallel operations for a particular user account, either in addition to or as an alternative of quotas for a group account, including group accounts in which the particular user account is included. In response to determining that the total number of operations is above the first threshold value, and if it is determined that the user account is associated with a third threshold value configured for operation executions solely associated with the user account, then a number of executing operations associated with the user account are read from the operations registry. If the number of operations associated with the user account is determined to be above the third threshold value, then the received request is rejected.

At 340, an instruction for executing the operation is provided, such as to an operations executor. The operation may then be executed, and, once completed, can be deleted from the operations registry.

In some instances, in response to completion of the execution of the operation, a notification for a status of the execution may be provided to a user device associated with the user account requesting the execution of the operation. Further, in response to completion of the execution of the operation, an unregistration operation may be performed for removing the registered operation from the operations registry.

Figure 4A:
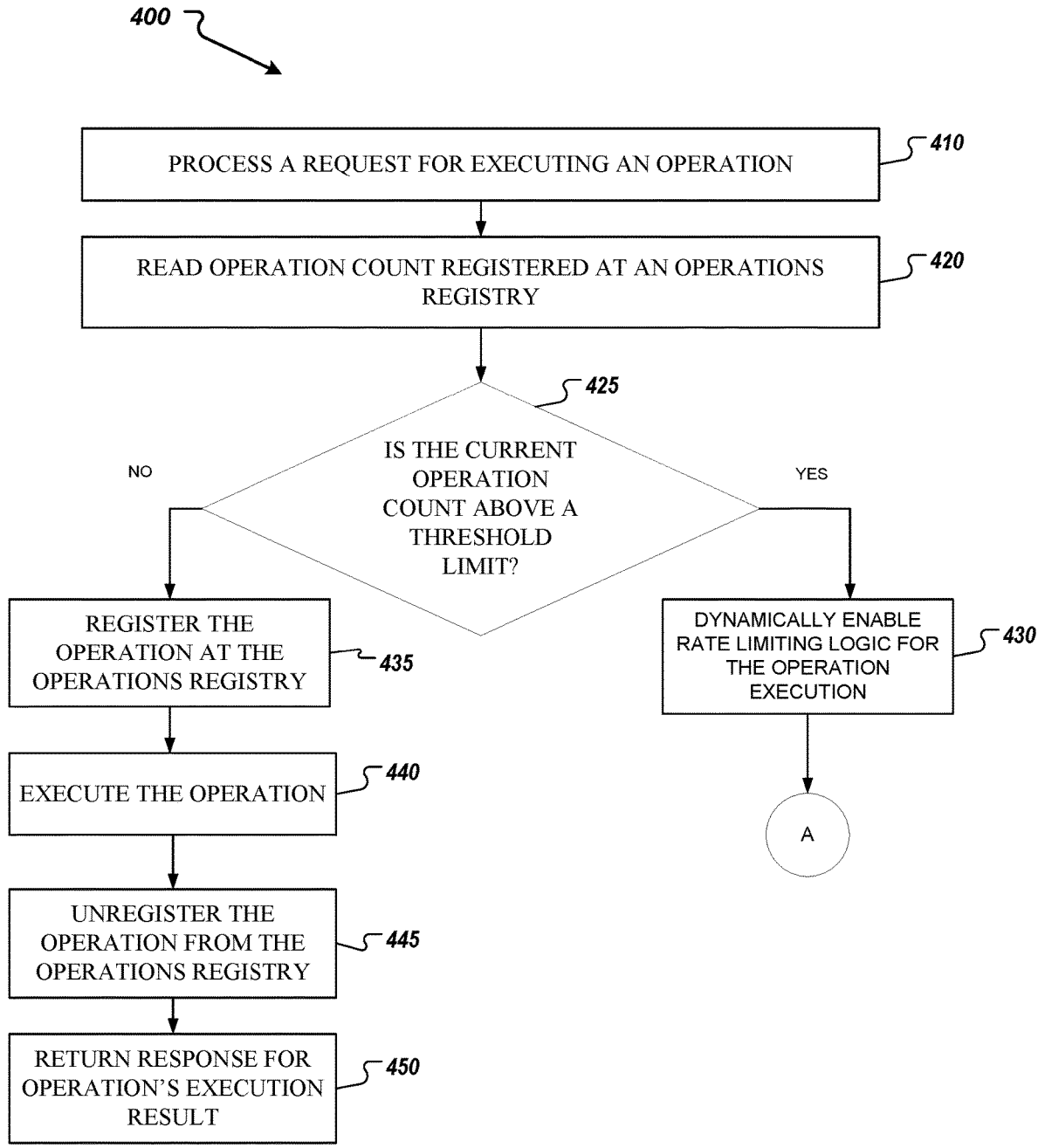
FIGS. 4A and 4B are a block diagram for an example method for dynamically configuring limitations for execution of operations for group accounts in accordance with implementations of the present disclosure.
Figure 4B:
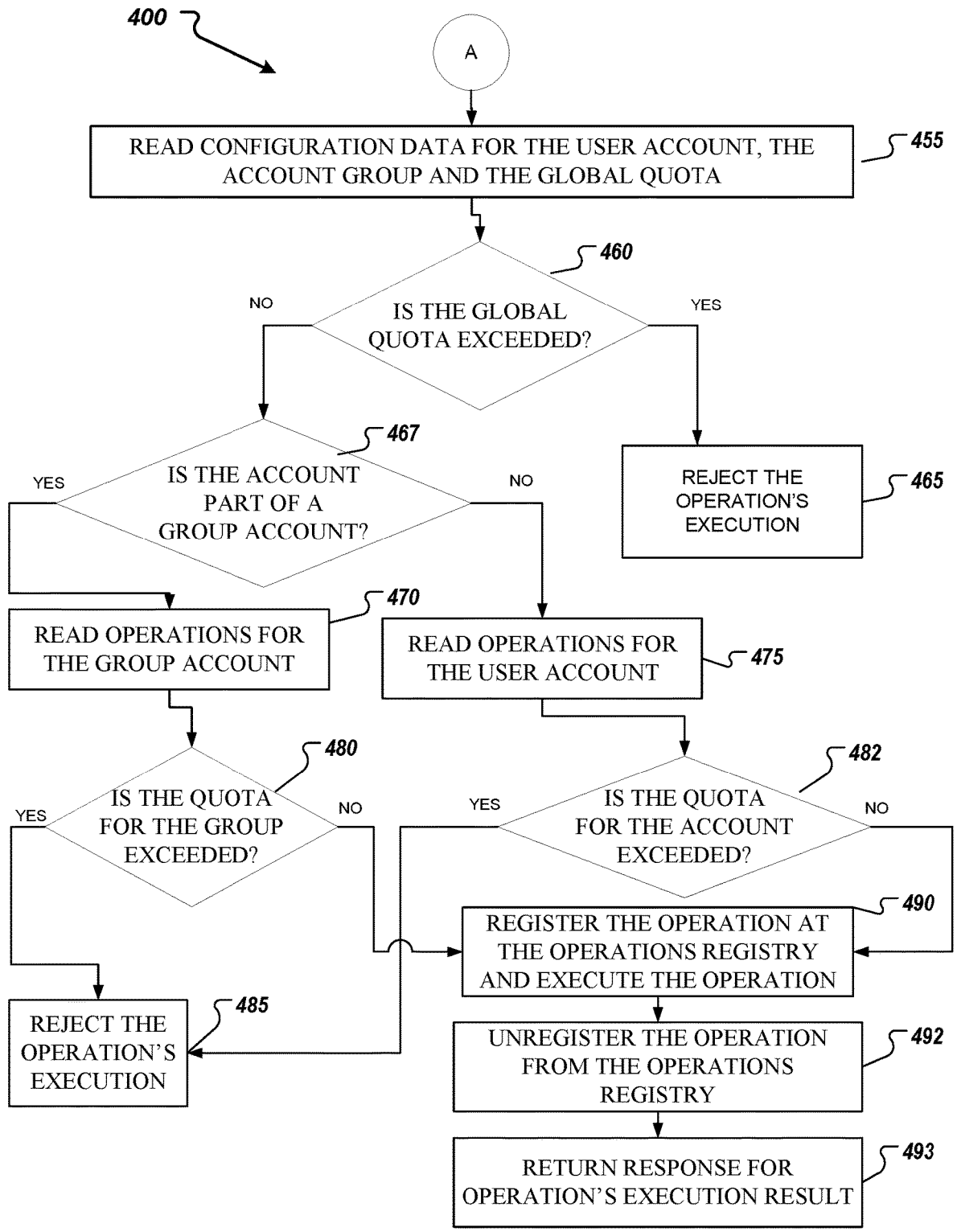

FIGS. 4A and 4B are a block diagram for an example method 400 for dynamically configuring limitations for execution of operations for group accounts in accordance with implementations of the present disclosure. In some instances, the method 400 is executed in relation to an application, such as application 120 of FIG. 1.

At 410, a request for execution of an operation is processed. In some instances, the received request is the received request at 202 of FIG. 2, and is received from a user and at an application for execution is an operation that is associated with heavy resource consumption. In some instances, the present solution can limit all operations, while in others, only relatively heavy operations (e.g., requiring resource consumptions above a certain threshold) that are pre-defined or are otherwise determined (e.g., manually, dynamically, and/or automatically) may be limited or restricted. In some instances, the heavy operation can be associated with heavy or resource intensive operations that consume a lot of the processing power. In some instances, heavy operations may be defined as operations that are directed to a defined service endpoint for the application and/or service. In some additional or alternative instances, if the application and/or service provides only one service end point for serving requests for operation execution, the heavy operations may be filtered out based on the type of the operation being requested or the parameters provided in the operation request. For example, one or more type of operations may be predefined as associated with heavy operations, or a certain type of operation associated with a parameter (and parameter value) complying with a given criterion may be categorized as heavy operations. In some additional or alternative instances, it can be determined what is the maximum number of operations that can be processed by an application without exceeding a given threshold percentage of the processing power. For example, for a given application, it can be empirically determined that up to 8 deploy operations can be executed in parallel without exceeding 80% of the CPU or RAM consumption. In that instance, 8 deployed operations can be configured as the global quota defining the maximum number of operations that may be allowed to be performed by application.

In some instances, execution of heavy operations that can be performed by an application in parallel may be limited based on capacity provided by the hardware of the system where the application is running. Thus, operations associated with higher levels of resource consumption may be tracked and limitations on execution of such operations may be imposed. By monitoring the number of operations associated with higher resource consumption that are executing, dynamic rate limiting of the operations may be enabled. Such rate limiting may provide technical advantages, such as, reducing the downtime of the application in case of overloading the application with requests that are exceeding the resource capacities of the application. Further, by applying such rate limiting, different users and user groups may be provided with balanced exposure of resources to be consumed through the application.

At 420, a count of operations registered at an operations registry is performed or read.

At 425, it is determined whether the current operation count is above a threshold limit. The threshold limit can be defined as a number of operations or a percentage of the capacity of the application to execute operations requested by all users associated with the application.

If the operation count is above the threshold limit, then at 430, rate limiting logic is dynamically enabled for further operation execution and initiation. If, however, the operation count is below the threshold limit, the operation will not be limited, and the corresponding operation is registered at the operations registry at 435. At 440, the operation is executed, for example, at an operations executor of the application, such as the operations executor 140 of FIG. 1 or the operations executor 240 of FIG. 2. At 445, which is performed after the operation is completed, the operation is unregistered from the operations registry, and at 450, a return response can be optionally provided, for example, to an end user, with a notification of the result from the operation's execution.

FIG. 4B includes operations that are performed after the dynamic rate limiting is enabled at 430 of FIG. 4A.

At 455, which occurs after 430, configuration data for the group account is read, as well as any defined global quota for the application defining a maximum number of allowed operation for the application. Additionally, if any user account configuration data is available, then that configuration data is read for further consideration as well.

At 460, a determination is made as to whether the global quota is exceeded. The global quota may be defined as the maximum allowed operations to run in parallel for the application. In some instances, the global quota may be defined as a number of operations that can be executed in parallel, for example, defining ten heavy operations of the same type to be the global quota. The global quota is exceeded when the operations registered at the operations registry equal the maximum number of operations that are allowed to run in parallel for the application. If the global quota is exceeded, at 465, the operation's execution is rejected.

In some other instances, the global quota may be defined in relation to multiple heavy operations of different types associated with different rates of resource consumption. In some instances, one application may be associated with different types of heavy operations. Each type of heavy operation may have its own configuration for a global quota determining maximum number of allowed heavy operations to be performed by such a heavy operation type. The global quota defined for one type of a heavy operation may not shared with the other operation types, thus, each operation type has its own global quota. For example, an application may define a first global quota of 100 operations of type deploy, i.e., deploy application operations, and a second global quota of 200 operation of type start, i.e., start application operations.

At 467, a determination is made as to whether the user account is a part of or associated with a group account. If so, then at 470, the number of running operations associated with the accounts included in the group account are read from the operations registry. At 480, a determination is then made as to whether the quota defined for the group account is exceeded by the number of operations associated with the group as read from the operations registry. If the group quota is determined to have been exceeded, then the operation execution is rejected at 485, which may be similar to the operation performed at 465.

If the user account is not part of or associated with a group account, then the operations for the user account are read from the operations registry at 475. At 482, a determination is made as to whether the quota defined for the user account is exceeded by the registered operations associated with the account. If so, then the operation's execution is rejected at 485.

If the quota for the group is determined to not be exceeded by the number of the read operations running for the group at 480, or if it is determined that the quota for the user account is determined not to be exceeded at 482, then method 400 continues at 490, where the operation to be performed is registered at the operations registry and is then executed. For example, the operation may be executed at or initiated by an operations executor, such as the operations executor 140 of FIG. 1. At 492, after the operation is completed, the operation is unregistered from the operations registry to ensure that the completed operations are not counted against the available operations for the group or user account. At 493, a response can be returned in some instances to the user requesting the operation to provide the result or confirmation of the operation's execution. For example, a notification of successful completion can be provided to a user device confirming whether the request was initiated and completed.

Figure 5:
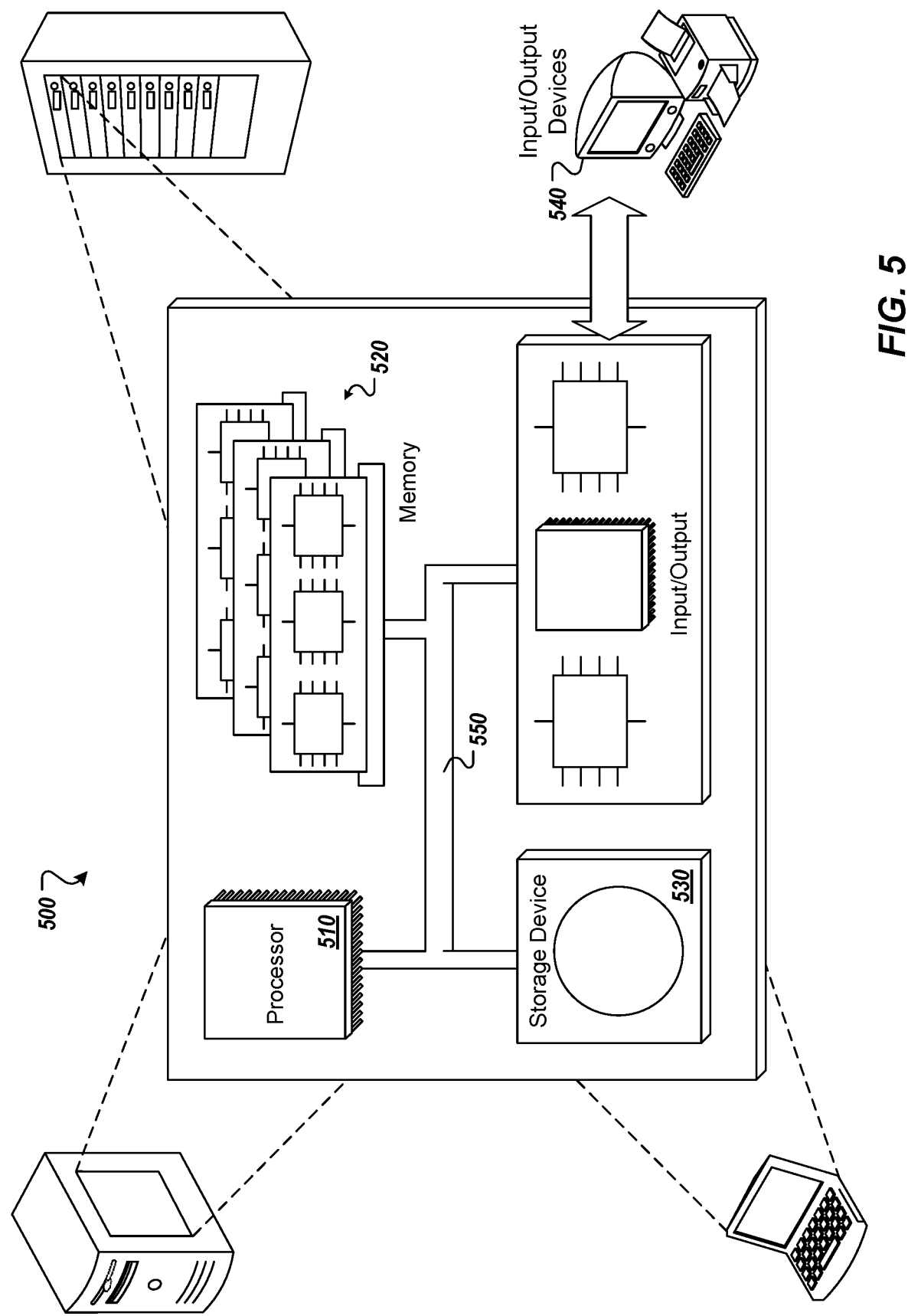
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor.

The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system, including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device, such as a CRT (cathode ray tube) or LCD (liquid crystal display) monitor for displaying information to the user and a keyboard and a pointing device, such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication, such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method, the method comprising:
   in response to receiving a request for execution of an operation by an application service, identifying a user account associated with the received request;
   determining a total number of operations registered at an operations registry, wherein the operations registry is associated with the application service, and wherein the operations registry stores data for executing operations;
   in response to determining that the total number of registered operations exceeds a first threshold value:
      reading, from the operations registry, a number of registered operations associated with a group account related the user account, wherein the group account is determined based on the user account, and
      in response to determining that the number of registered operations associated with the group account does not exceed a second threshold value configured for operation executions associated with the group account, registering the operation at the operations registry;
   in response to determining that the total number of registered operations does not exceed the first threshold value, registering the operation at the operations registry; and
   providing an instruction to execute the registered operation to an operations executor.

2. The method of claim 1, further comprising:
   defining a plurality of group accounts for grouping related sets of user accounts, wherein a user account from the sets of user accounts is associated with an allocated number of operations by the application service.

3. The method of claim 1, further comprising:
   in response to determining that the total number of registered operations exceeds the first threshold value, dynamically configuring a first number of operations as the second threshold value for executing operations from user accounts corresponding to the group account, wherein the group account is part of a plurality of group accounts configured for the application service.

4. The method of claim 1, the method further comprising:
   in response to determining that the operation's execution has completed, performing an unregistration operation to remove the registered operation from the operations registry.

5. The method of claim 1, wherein the application service is a backend service associated with a predefined hardware and software resources to perform operations in parallel.

6. The method of claim 1, further comprising:
   configuring the operations registry to track operations executed by the application service, wherein an operation from the tracked operations is registered when it starts to execute, and wherein the operation is maintained as registered in the operations registry until after completion.

7. The method of claim 6, wherein the operation registry stores data for operations associated with user accounts requesting execution of operations at the application service.

8. The method of claim 1, further comprising:
   in response to determining the read number of operations associated with the group account related the user account exceeds the second threshold value for the group account, providing an instruction to reject execution of the operation.

9. The method of claim 1, further comprising:
   in response to determining that the total number of operations registered at the operations registry exceeds a quota defining a maximum number of allowed operations for execution in parallel for all accounts, rejecting the received request.

10. The method of claim 1, further comprising:
    in response to determining that the total number of operations does not exceed the first threshold value, providing an instruction to execute the operation to the operations executor.

11. The method of claim 1, wherein in response to determining that the total number of operations exceeds the first threshold value, the method further comprises:
    determining that the user account is associated with a third threshold value configured for operation executions solely associated with the user account,
    in response to the determination:
       reading, at the operations registry, a number of operations associated with the user account, and
       in response to determining that the number of registered operations associated with the user account exceeds the third threshold value, rejecting the received request.

12. The method of claim 1, further comprising:
    in response to determining that the total number of operations exceeds the first threshold value and that the second threshold value associated with the group account is equal to or less than the number of registered operations associated with the group account, rejecting the received request.

13. A non-transitory, computer-readable medium coupled to one or more processors and having instructions stored thereon which, when executed by the one or more processors, cause the one or more processors to perform operations, the operations comprising:

in response to receiving a request for execution of an operation by an application service, identifying a user account associated with the received request;

determining a total number of operations registered at an operations registry, wherein the operations registry is associated with the application service, and wherein the operations registry stores data for executing operations;

in response to determining that the total number of registered operations exceeds a first threshold value:

reading, from the operations registry, a number of registered operations associated with a group account related the user account, wherein the group account is determined based on the user account, and in response to determining that the number of registered operations associated with the group account does not exceed a second threshold value configured for operation executions associated with the group account, registering the operation at the operations registry;

in response to determining that the total number of registered operations does not exceed the first threshold value, registering the operation at the operations registry; and providing an instruction to execute the registered operation to an operations executor.

14. The computer-readable medium of claim 13, wherein the operations further comprise:

in response to determining that the total number of registered operations exceeds the first threshold value, dynamically configuring a first number of operations as the second threshold value for executing operations from user accounts corresponding to the group account, wherein the group account is part of a plurality of group accounts configured for the application service, wherein the application service is a backend service associated with a predefined hardware and software resources to perform operations in parallel;

in response to determining that the operation's execution has completed, performing an unregistration operation to remove the registered operation from the operations registry;

in response to determining the read number of operations associated with the group account related the user account exceeds the second threshold value for the group account, providing an instruction to reject execution of the operation;

in response to determining that the total number of operations registered at the operations registry exceeds a quota defining a maximum number of allowed operations for execution in parallel for all accounts, rejecting the received request;

in response to determining that the total number of operations does not exceed the first threshold value, providing an instruction to execute the operation to the operations executor; and in response to determining that the total number of operations exceeds the first threshold value and that the second threshold value associated with the group account is equal to or less than the number of registered operations associated with the group account, rejecting the received request.

15. The computer-readable medium of claim 13, wherein the operations further comprise:

configuring the operations registry to track operations executed by the application service, wherein an operation from the tracked operations is registered when it starts to execute, and wherein the operation is maintained as registered in the operations registry until after completion, wherein the operation registry stores data for operations associated with user accounts requesting execution of operations at the application service.

16. The computer-readable medium of claim 13, wherein in response to determining that the total number of operations exceeds the first threshold value, the operations further comprise:

determining that the user account is associated with a third threshold value configured for operation executions solely associated with the user account, in response to the determination:

reading, at the operations registry, a number of operations associated with the user account, and in response to determining that the number of registered operations associated with the user account exceeds the third threshold value, rejecting the received request.

17. A system comprising a computing device; and a computer-readable storage device coupled to the computing device and having instructions stored thereon which, when executed by the computing device, cause the computing device to perform operations, the operations comprising:

in response to receiving a request for execution of an operation by an application service, identifying a user account associated with the received request;

determining a total number of operations registered at an operations registry, wherein the operations registry is associated with the application service, and wherein the operations registry stores data for executing operations;

in response to determining that the total number of registered operations exceeds a first threshold value:

reading, from the operations registry, a number of registered operations associated with a group account related the user account, wherein the group account is determined based on the user account, and in response to determining that the number of registered operations associated with the group account does not exceed a second threshold value configured for operation executions associated with the group account, registering the operation at the operations registry;

in response to determining that the total number of registered operations does not exceed the first threshold value, registering the operation at the operations registry; and providing an instruction to execute the registered operation to an operations executor.

18. The system of claim 17, wherein the system further comprises instructions which when executed causes the compute the computing device to perform operations comprising:

in response to determining that the total number of registered operations exceeds the first threshold value, dynamically configuring a first number of operations as the second threshold value for executing operations from user accounts corresponding to the group account, wherein the group account is part of a plurality of group accounts configured for the application service, wherein the application service is a backend service associated with a predefined hardware and software resources to perform operations in parallel;

in response to determining that the operation's execution has completed, performing an unregistration operation to remove the registered operation from the operations registry;

in response to determining the read number of operations associated with the group account related the user account exceeds the second threshold value for the group account, providing an instruction to reject execution of the operation;

in response to determining that the total number of operations registered at the operations registry exceeds a quota defining a maximum number of allowed operations for execution in parallel for all accounts, rejecting the received request;

in response to determining that the total number of operations does not exceed the first threshold value, providing an instruction to execute the operation to the operations executor; and in response to determining that the total number of operations exceeds the first threshold value and that the second threshold value associated with the group account is equal to or less than the number of registered operations associated with the group account, rejecting the received request.

19. The system of claim 17, wherein the system further comprises instructions which when executed causes the compute the computing device to perform operations comprising:

configuring the operations registry to track operations executed by the application service, wherein an operation from the tracked operations is registered when it starts to execute, and wherein the operation is maintained as registered in the operations registry until after completion, wherein the operation registry stores data for operations associated with user accounts requesting execution of operations at the application service.

20. The system of claim 17, wherein the system further comprises instructions which when executed causes the compute the computing device to perform operations in response to determining that the total number of operations exceeds the first threshold value, wherein the operations further comprise:

determining that the user account is associated with a third threshold value configured for operation executions solely associated with the user account, in response to the determination:
reading, at the operations registry, a number of operations associated with the user account, and
in response to determining that the number of registered operations associated with the user account exceeds the third threshold value, rejecting the received request.

\* \* \* \* \*